US012617734B2

(12) United States Patent　　(10) Patent No.:　US 12,617,734 B2

McCaffrey　　(45) Date of Patent:　May 5, 2026

(54) CERAMIC MATRIX COMPOSITE ARTICLE AND METHOD OF MAKING THE SAME

(71) Applicant: RTX Corporation, Farmington, CT (US)

(72) Inventor: Michael G. McCaffrey, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 151 days.

(21) Appl. No.: 18/366,075

(22) Filed: Aug. 7, 2023

(65) Prior Publication Data

US 2024/0043350 A1　　Feb. 8, 2024

Related U.S. Application Data

(60) Provisional application No. 63/395,537, filed on Aug. 5, 2022.

(51) Int. Cl.
　C04B 41/52　　(2006.01)
　C04B 41/91　　(2006.01)
(52) U.S. Cl.
　CPC ............. C04B 41/52 (2013.01); C04B 41/91 (2013.01)
(58) Field of Classification Search
　CPC ...................................................... C04B 41/52
　See application file for complete search history.

(56) References Cited

U.S. PATENT DOCUMENTS

| | | | |
|---|---|---|---|
| 9,850,175 | B2 | 12/2017 | Araki et al. |
| 11,198,253 | B2 | 12/2021 | Nation et al. |
| 2004/0075197 | A1* | 4/2004 | Tang ..................... B29C 64/165 |
| | | | 264/492 |
| 2013/0122259 | A1* | 5/2013 | Lee ........................ C23C 28/048 |
| | | | 428/164 |
| 2013/0307175 | A1* | 11/2013 | Tang ........................ B22F 10/36 |
| | | | 264/42 |
| 2020/0180296 | A1* | 6/2020 | Burns .................... B33Y 10/00 |
| 2020/0370439 | A1 | 11/2020 | Nelson et al. |

FOREIGN PATENT DOCUMENTS

| | | | | |
|---|---|---|---|---|
| CN | 110997779 | A * | 4/2020 | ........... B29C 64/106 |
| EP | 3029274 | | 6/2016 | |
| EP | 2524069 | | 3/2018 | |
| WO | 2016133579 | | 8/2016 | |
| WO | 2021067978 | | 4/2021 | |

OTHER PUBLICATIONS

European Search Report for European Patent Application No. 23189856.0 dated Dec. 22, 2023.

* cited by examiner

*Primary Examiner* — Tabatha L Penny

(74) *Attorney, Agent, or Firm* — Carlson, Gaskey & Olds, P.C.

(57)　　　　　　ABSTRACT

A method of forming a feature on an article includes applying a powder material stock to a surface of an article, the powder material stock being capable of being transformed into a solid feature by the application of energy; applying energy to a portion of the powder material stock within a footprint of a feature to form the feature within the footprint; and removing excess powder material stock from the surface of the article. A coated article is also disclosed.

14 Claims, 4 Drawing Sheets

200

PROVIDE ARTICLE — 202

APPLY POWDER TO SURFACE
OF THE ARTICLE — 204

DIRECT LASER OVER SURFACE OF THE
ARTICLE TO FORM FEATURE — 206

REMOVE EXCESS POWDER
FROM THE SURFACE — 208

CERAMIC MATRIX COMPOSITE ARTICLE AND METHOD OF MAKING THE SAME

CROSS-REFERENCE TO RELATED APPLICATIONS

This application claims the benefit of Provisional U.S. Patent Application Ser. No. 63/395,537 filed Aug. 5, 2022; the disclosure of which is incorporated by reference in its entirety herein.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines, and methods of coating such articles. Components, such as gas turbine engine components, may be subjected to high temperatures, corrosive and oxidative conditions, and elevated stress levels. Ceramic materials such as ceramic matrix composites may be suitable for use in such conditions.

SUMMARY

A method of forming a feature on an article according to an exemplary embodiment of this disclosure, among other possible things includes applying a powder material stock to a surface of an article, the powder material stock being capable of being transformed into a solid feature by the application of energy; applying energy to a portion of the powder material stock within a footprint of a feature to form the feature within the footprint; and removing excess powder material stock from the surface of the article.

In a further example of the foregoing, a footprint of the powder material stock is larger than the footprint of the feature.

In a further example of any of the foregoing, powder material stock outside of the footprint of the feature is undisturbed after the step of applying energy.

In a further example of any of the foregoing, the method also includes the step of grinding the feature after the removing step.

In a further example of any of the foregoing, the article is a ceramic material composite article.

In a further example of any of the foregoing, the method also includes applying a second powder material stock to the surface of the article, the second powder material stock being capable of being transformed into a solid coating by the application of energy; applying energy to a portion of the second powder material stock within a coating layer footprint to form a coating layer over the feature; and removing excess of the second powder material stock from the surface of the article and the feature.

In a further example of any of the foregoing, the coating layer footprint is larger than the footprint of the feature such that the coating layer surrounds all exposed surface of the feature.

In a further example of any of the foregoing, the coating layer is disposed on an outwardly facing surface of the feature and overhangs the outwardly facing surface of the feature, forming a pocket underneath the layer and adjacent the feature.

In a further example of any of the foregoing, the step of applying the powder material stock includes disposing the powder material stock in a slurry and applying the slurry to the surface of the article.

In a further example of any of the foregoing, the slurry includes a binder that temporarily adheres the powder material stock to the surface of the article.

In a further example of any of the foregoing, the method also includes drying the slurry prior to the step of applying energy.

In a further example of any of the foregoing, the energy is in the form of a laser beam.

In a further example of any of the foregoing, the energy is in the form of microwave energy.

In a further example of any of the foregoing, the article is a ceramic matrix composite article.

A coated article according to an exemplary embodiment of this disclosure, among other possible things includes an article, a coating disposed on the article, and one or more tacks disposed on the article. The one or more tacks each include a feature, and at least one layer disposed on an outwardly facing surface of the feature and overhanging the outwardly facing surface such that a pocket is disposed under the layer adjacent the feature. The pocket mechanically tacks the coating to the article.

In a further example of the foregoing, the coating is an environmental barrier coating.

In a further example of any of the foregoing, the at least one layer includes two layers. The two layers form a taper with respect to the feature.

In a further example of any of the foregoing, the one or more features are ribs.

In a further example of any of the foregoing, the one or more features comprise an array of features.

In a further example of any of the foregoing, the article is a ceramic matrix composite article.

DETAILED DESCRIPTION

Figure 1:
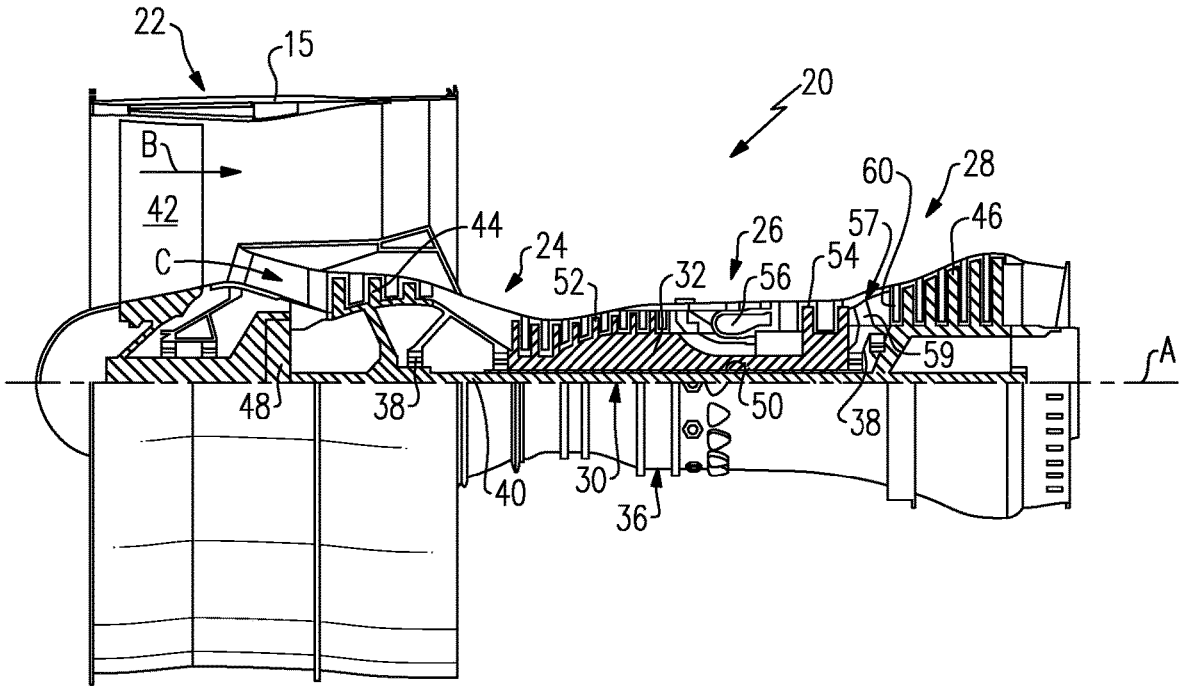
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram \, °R)/(518.7° R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Ceramic matrix composite ("CMC") articles can be used in various parts of the engine 20, such as an airfoil in the compressor section 24 or turbine section 28, a combustor liner panel in the combustor section 26, a blade outer air seal, or other component that would benefit from the examples herein. In general, CMC articles include ceramic-based reinforcements disposed in a ceramic-based matrix. In one example, the ceramic-based reinforcements are fibers, but it should be understood that other reinforcements like particles, platelets, etc. are also contemplated.

CMC articles may exhibit a surface roughness that corresponds to the placement of the ceramic-based reinforcements. For instance, the matrix may not be thick enough to mask undulations formed between adjacent reinforcements and/or mask imperfections resulting from matrix infiltration processes like chemical vapor infiltration/deposition, polymer infiltration and pyrolysis, and/or melt infiltration. Additionally, the tooling used to shape CMC articles may leave impressions in the surface of the article. In some circumstances, it may be advantageous to provide a smooth area on part of the CMC article. For example, where sealing against the CMC is required a smooth seal land is preferred to improve the quality of the seal. However, conventional methods of smoothing surfaces are not suitable for CMC materials. For instance, grinding or sanding can cause damages to the reinforcements.

It may also be advantageous to provide small (in comparison to the size of the article) features on the surface of the CMC article for various applications, such as standoffs for positioning the CMC article relative to an adjacent component. In another example, it may be advantageous to provide a small smooth pad for marking the article, such as by laser marking. However, it is difficult to create such features under certain circumstances such as on non-line-of-sight surfaces of the CMC article, or where the article is very close to other articles within an engine 20. Conventional methods of applying features such as plasma spray methods are not well-suited for applying small features on such surfaces. Moreover, plasma spray methods require masking areas of an article where it is not desired to deposit material, and may not provide a strong adhesion between the article and the feature.

Figure 2:
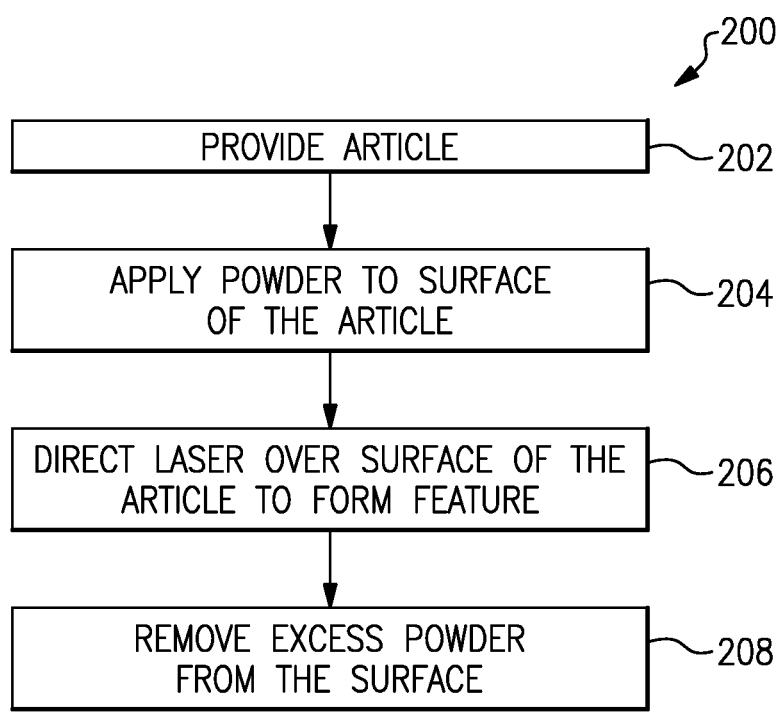
FIG. 2 schematically illustrates a method of applying a feature to an article.
Figure 3A:
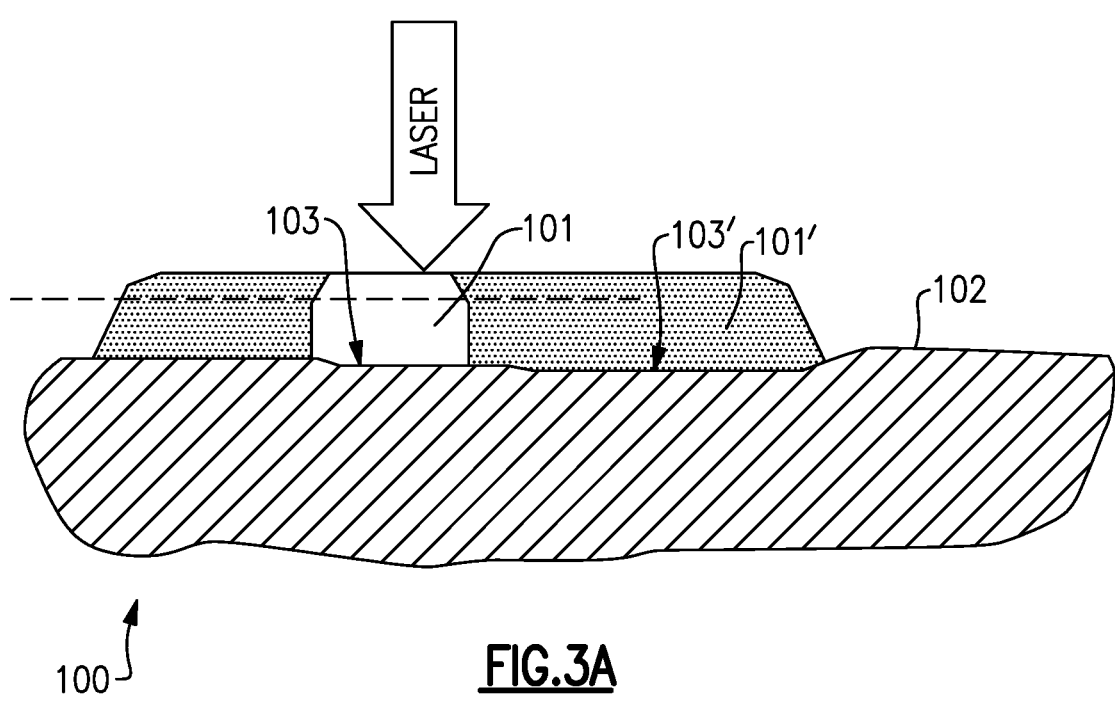
FIGS. 3A-B schematically illustrate an article with a feature.
Figure 3B:
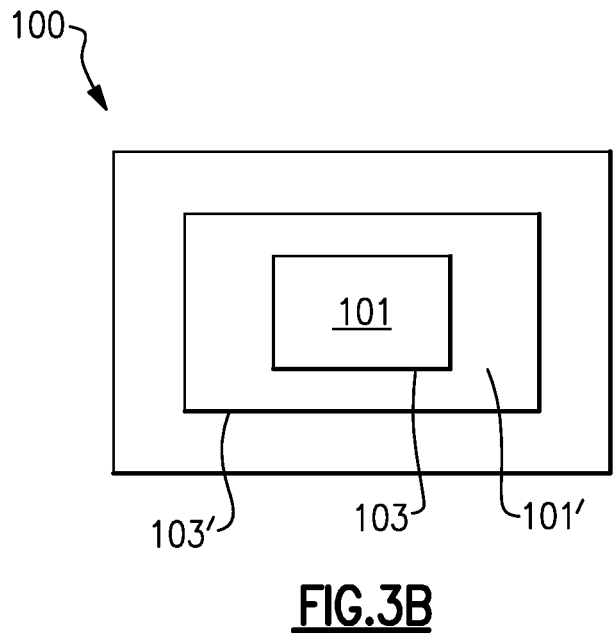

Accordingly, a method 200 of applying features to an article, such as the CMC articles discussed above, by additive manufacturing is schematically shown in FIG. 2. In step 202, an article 100 such as a CMC article is provided as shown in FIGS. 3A-B. The feature 101 is also shown in FIGS. 3A-B.

In step 204, powder material stock 101' is applied to a surface 102 of the article 100. The powdered material stock 101' is a material that can be transformed into a solid by application of energy such as in the form of a laser beam, microwave energy, induction heating, an arc source such as a plasma torch, etc. in an additive manufacturing process, which is well-known in the art. The subsequent description will refer to a laser as the example energy source for simplicity, but it should be understood that the energy source can be another energy source in other examples. The particular powder is selected based on the desired chemistry of the feature 101. The stock 101' is applied over a footprint 103' of the surface 102 of the article 100 that is larger than the desired footprint 103 of the feature 101. That is, the powdered material stock 101' need not be applied in a precise way with respect to the desired footprint 101' of the feature 101. Moreover, the powdered material stock 101' can be applied in areas where it is not desired to create a feature, which will be discussed in more detail below.

In a particular example, the powdered material stock 101' is applied by a slurry application method. The powder is suspended in a carrier liquid to form a slurry, and the slurry is applied to the surface 102 of the article 100 by spraying, painting, dipping, or any other known method. The slurry may also include a polymeric binder to temporarily adhere the powder to the surface 102 of the article 100. In this example, the slurry may be dried prior to step 206 as is well known in the art.

In step 206, an energy source such as a laser beam is directed over the surface 102 of the article 100 and powdered material stock 101' along the footprint 103 of the feature 101 to form the feature 101. Only those sections of powdered material stock 101' that interact with the laser are converted to solid material. Accordingly, the remaining powder is left undisturbed and is capable of being removed in step 208.

The application of an energy source allows for precise conversion of powdered material stock 101' to solid material and can be used on surfaces that are not accessible to deposition methods such as plasma spray methods, including non-line-of-sight surfaces. For instance, the energy source can be used in areas with about one inch of less of clearance with an adjacent structure or surface.

In step 208, the excess undisturbed powder material stock 101' is removed by any suitable method such as brushing, washing, etc.

In some examples, the feature 101 can be formed with excess material in step 206, and can be subject to post-processing steps such as grinding after step 208. The grinding allows for precise control of the size and shape of the feature 101 and provides a smooth surface, without concern for damaging the fibers of the article 100 wherein the article is a CMC article.

Figure 4:
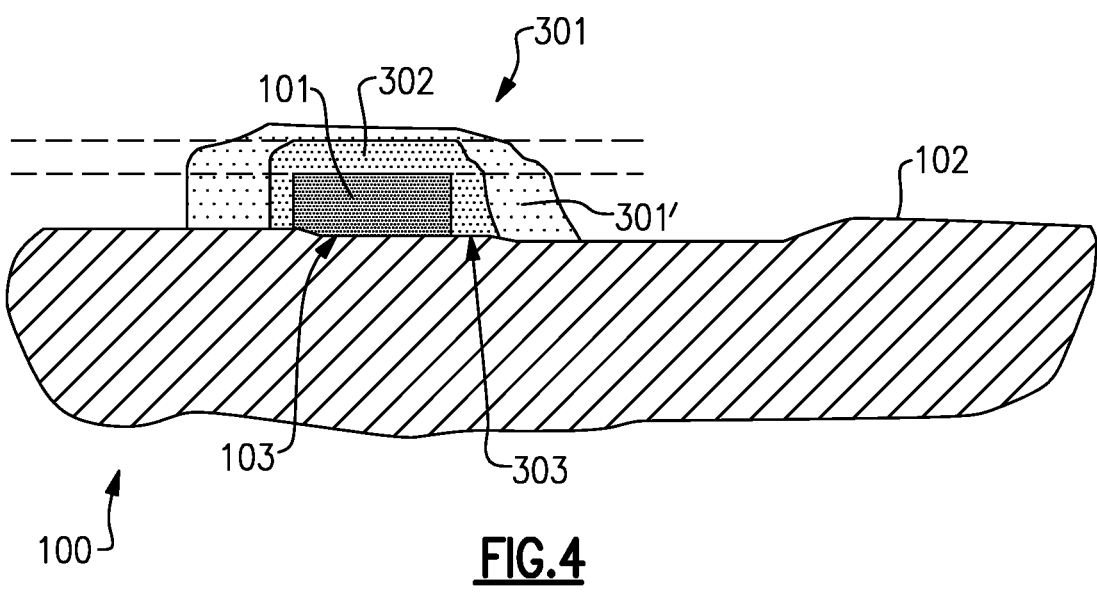
FIG. 4 schematically illustrates another example article with a feature.

In one example, the method 200 can be repeated after step 208 with the same powdered material stock 101' or a different material to yield a multilayer feature 301, shown in FIG. 4. For instance, the multilayer feature 301 can include a feature 101 as described above with a coating layer 302. The coating layer 302 has a different composition and/or density as the feature 101 and provides protection such as mechanical protection, thermal protection, and/or environmental protection to the feature 101. The coating layer 302 is applied by the method 200 using a coating powder stock 301'.

In a particular example, the coating layer footprint 303 is larger than the footprint 103 of the feature 101 to provide the coating layer 302 surrounding the feature 101. That is, the coating 302 surrounds all exposed surfaces of the feature 101.

Figure 5:
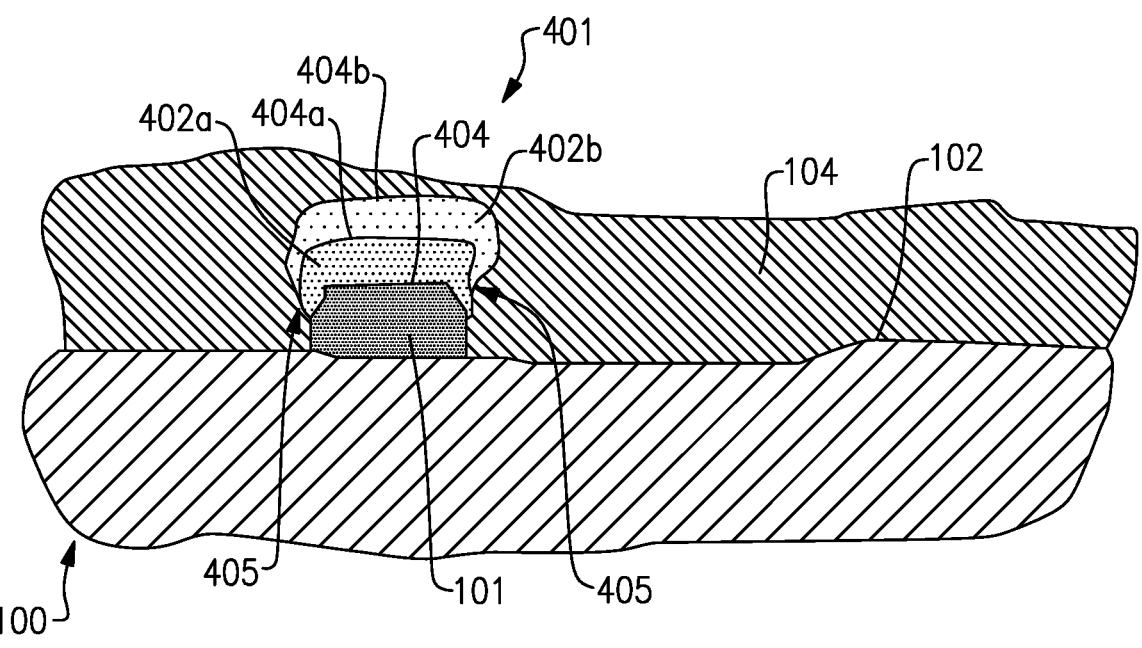
FIG. 5 schematically illustrates another example article with a feature.

Another example multilayer feature 401 is shown in FIG. 5. In this example, the multilayer feature 401 includes a feature 101 with two or more layers 402a/402b disposed over the feature 101. In this example, the layers 402a/402b are formed by successive passes of the laser in step 206. That is, step 206 of the method 200 described above is performed once to form the feature 101, and then is repeated two or more times to form the layers 402a/402b. Step 206 may be repeated with or without deposition additional stock powder material stock 101', e.g., without repeating step 204.

In a particular example, the repetitions of step 206 are performed such that the layers 402a/402b are formed with a tapering effect with respect to the size of the feature 101. For instance, the first layer 402a may have a larger outwardly (with respect to the article 100) facing extending surface 404a than an outwardly facing surface 404 of the footprint 101, and the second layer 402b may have a larger outwardly facing surface 404b than the outwardly facing surface 404a of the the first layer 402a.

In this example, the layers 402a/402b do not surround the entire feature 101 as in the example of FIG. 4 discussed above, but rather are deposited primarily along the outwardly facing surface 404 of the feature 101 and overhanging the outwardly facing surface 404 of the feature 101/ outwardly facing surface 404a of the layer 402a. In this way, the multilayer feature 401 has a mushroom shape with pockets 405 underneath the overhang and adjacent the feature 101. In the example of FIG. 5, a coating 104 such as an environmental barrier coating can be disposed over the article 100. The pockets 405 can assist in mechanically tacking or locking the coating 104 onto the article 100. In this way the feature 401 act as a tacks.

In a particular example, the article 100 may include an array of tacks 401 such as one or more rows or a grid of tacks 401 to provide improved retention of a coating 104 on the article 100. The tacks 401 may also be in the form of a rib or wall.

In another example, a row of tacks 401 can delineate different coating regions on the article 101.

As used herein, the term "about" has the typical meaning in the art, however in a particular example "about" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of forming a feature on an article, comprising:

(a) applying a powder material stock to a surface of an article, the powder material stock being capable of being transformed into a solid feature by application of energy;

(b) applying energy to a portion of the powder material stock within a footprint of a feature to form the feature within the footprint;

(c) removing excess powder material stock from the surface of the article;

(d) applying a second powder material stock to the surface of the article, the second powder material stock being capable of being transformed into a solid coating by application of energy;

(e) applying energy to a portion of the second powder material stock within a coating layer footprint to form a coating layer over the feature, wherein the coating layer overhangs an outwardly facing surface of the feature and forms a pocket underneath the coating layer and adjacent the feature;

(f) removing excess of the second powder material stock from the surface of the article and the feature; and (g) applying an environmental barrier coating over the article including over the feature, the pocket interlocking with the environmental barrier coating to mechanically tack the environmental barrier coating on the article.

2. The method of claim 1, where a footprint of the powder material stock is larger than the footprint of the feature.

3. The method of claim 1, wherein powder material stock outside of the footprint of the feature is undisturbed after the step of applying energy.

4. The method of claim 1, further comprising a step of grinding the feature after the removing step.

5. The method of claim 1, wherein the article is gas turbine engine article made of a ceramic material composite article.

6. The method of claim 1, wherein the coating layer footprint is larger than the footprint of the feature such that the coating layer surrounds all exposed surface of the feature.

7. The method of claim 1, wherein the step of applying the powder material stock includes disposing the powder material stock in a slurry and applying the slurry to the surface of the article.

8. The method of claim 7, wherein the slurry includes a binder that temporarily adheres the powder material stock to the surface of the article.

9. The method of claim 7, further comprising drying the slurry prior to the step of applying energy.

10. The method of claim 1, wherein the energy is in the form of at least one of a laser beam or microwave energy.

11. The method of claim 1, wherein the article is a ceramic matrix composite article.

12. The method of claim 1, wherein the powder material stock and the second powder material stock are of different composition from each other.

13. The method of claim 1, further comprising repeating steps (a), (b), and (c) to provide an array of features on the article.

14. The method of claim 13, wherein the array is a grid.

* * * * *